Patented May 26, 1925.

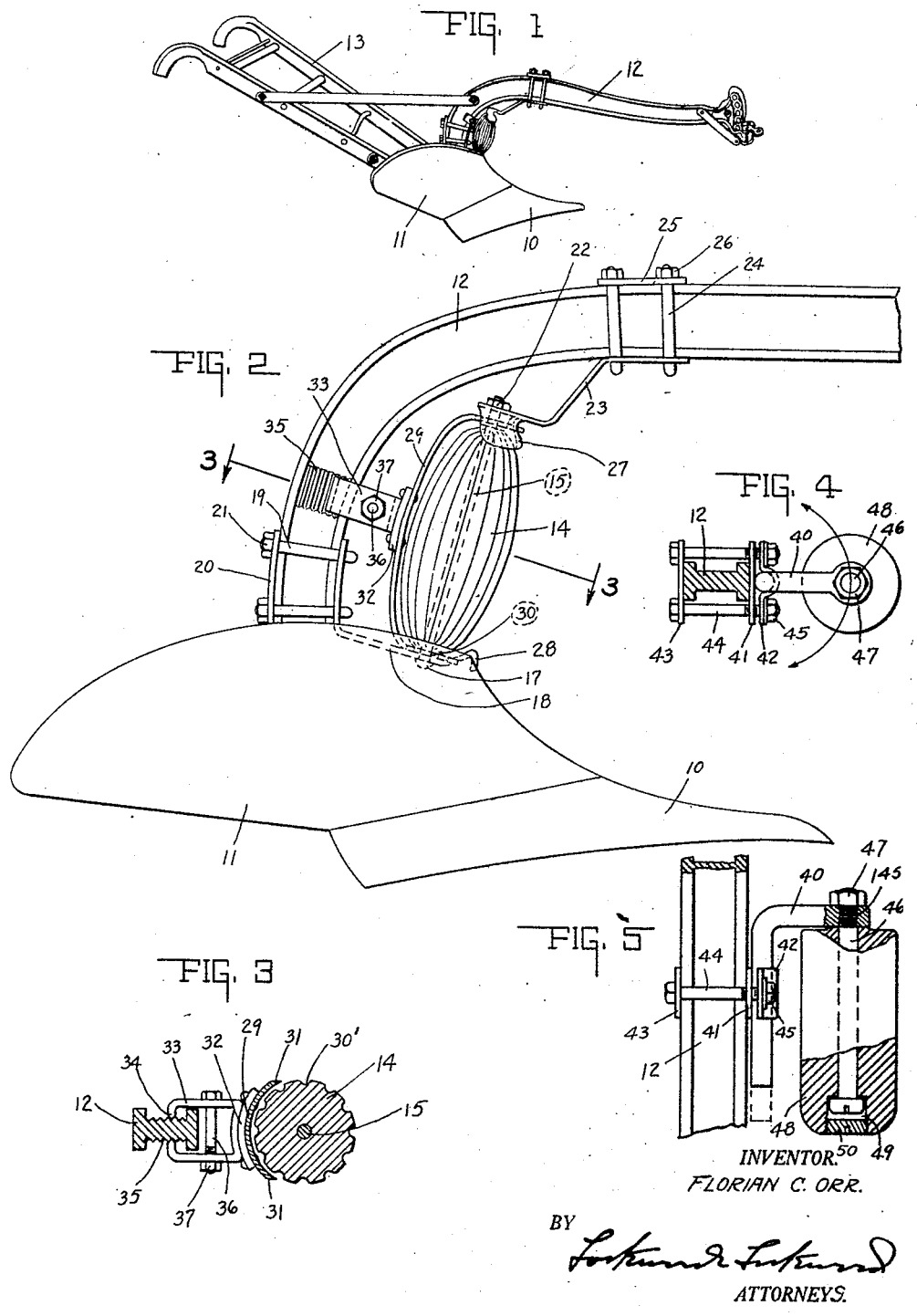

1,539,693

UNITED STATES PATENT OFFICE.

FLORIAN C. ORR, OF HAMLET, INDIANA.

NONCHOKING ATTACHMENT FOR PLOWS.

Application filed August 6, 1923. Serial No. 655,977.

*To all whom it may concern:*

Be it known that I, FLORIAN C. ORR, a citizen of the United States, and a resident of Hamlet, county of Starke, and State of Indiana, have invented a certain new and useful Nonchoking Attachment for Plows; and I do hereby declare that the following is a full, clear, and exact description thereof, reference being had to the accompanying drawings, in which like numerals refer to like parts.

This invention relates to a choking prevention device for plows and the mounting thereof upon a plow.

The chief object of the invention is to provide an improved choking prevention device and to improve the mounting therefor.

The full nature of this invention will be understood from the accompanying drawing and the following description and claims.

In the drawing Fig. 1 is a side elevational view of a plow and the invention attached thereto. Fig. 2 is an enlarged side elevational view of the plow, mold board, plow share and plow beam with the invention attached thereto. Fig. 3 is a transverse sectional view taken on the line 3—3 of Fig. 2. Fig. 4 is a transverse sectional view of a plow beam and a top plan view of the nonchoking roller and the mounting therefor. Fig. 5 is a side elevation of a modification showing other parts in detail.

In the drawings 10 indicates the usual plow share, 11 the mold board and 12 the plow beam supporting the mold-board and the share. It is old to mount a rotating member adjacent the plow share or mold board, which member is adapted to prevent choking of the plow by weeds, trash or sod. The present invention consists in the particular positioning of the choking prevention device and the mounting thereof, as well as the construction of said device. A rotatable member 14 of substantially watermelon or ellipsoidal shape is rotatably supported upon a longitudinally extending bolt 15, which bolt has the head 17 engaging a bracket 18 secured to the plow beam adjacent the mold board by the U-bolts 19, the clamping plate 20 and the nuts 21. The other end of the bolt 15 is provided with a securing nut 22 and a depending bracket 23 is positioned between said nut and the upper end of said roller. The other end of the bracket 23 is similarly secured to the plow beam by means of U-bolts 24, clamping plate 25 and nuts 26. By the aforesaid construction it will be noted that the roller 14 is rotatably mounted upon an axis inclined forwardly and may be adjustably positioned upon the plow beam by shifting the supporting brackets.

In the present invention the bracket 23, which extends downwardly and rearwardly, is provided with a guard or deflecting portions 27 which serve to direct weeds and trash from the pivotal mounting downwardly towards the center of the roller so as to be engaged by the same. Herein such guard portions are shown integral with the bracket 23, but may be separable therefrom and be secured to the bracket or in position adjacent thereto by the bolt 15 and nut 22. The lower bracket member 18 is extended forwardly and is provided with a curved guard portion 28, which herein is shown integral with a bracket 18, or may be separable therefrom. This guard portion 28 prevents choking of the roller 15 by directing upwardly the weeds and trash etc. There is also associated with the roller 14 a cleaning and cutting device which herein is illustrated in the form of an arcuate knife 29 which is also curved to have substantially the same outline as the roller 14. Said knife is provided with an upper and a lower supporting portion which are substantially the same, and which is provided with a plurality of holes 30 for receiving the bolt 15. In this manner the cleaner and cutter 29 may be adjusted to and from the roller 14. As shown clearly in Figs. 2 and 3, the roller 14 is provided with a plurality of longitudinally extending grooves 30' and these grooves provide a toothed surface upon the roller so as to cause the weeds, trash and the like to rotate said roller until said weeds, trash and the like engage the edge 31 of the cleaning plate 29. As shown clearly in Fig. 3, there are two edges 31 provided.

Positioned intermediate the length of the knife 29 there is a plate 32 and to said plate is secured a U-shaped clamping member 33 having an engaging portion 34 for engaging a complementarily formed portion 35 on the plow beam 12. The clamping bolt 36, by means of the nut 37, causes the engaging portions 34 to grip the plow beam 12 and maintain the cleaner in the desired position with reference to the roller 14.

In Figs. 4 and 5 there is illustrated a modified form of the invention. In this form of the invention an angle member 40 is suitably secured between two plates 41 and 42. The plate 41 cooperates with another plate 43 and suitable bolts 44 clamp the entire construction together and to the plow beam 12, by means of the nuts 45. The overhanging portion of the angle member 40 has a threaded opening 145 adapted to receive the stem or bolt member 46 which is locked thereto by means of the nut 47. The bolt 46 extends through the apertured roller 48 which has a recess 49 concentric with the opening adapted to receive the bolt 46. Said recess 49 is threaded and is adapted to receive a closure 50, thereby forming a chamber in which lubricant may be positioned. As shown clearly in Fig. 4, loosening the nuts 45 permits the roller bracket arm 40 to be moved to either side of the median position, and the dotted line in Fig. 5 illustrates the longitudinal adjustment permissible by loosening the nuts 45.

The invention claimed is:

1. The combination with a plow having a mold board and plow beam, of a choking prevention roller pivotally mounted and spaced between the two, and a deflector depending from said beams and above the roller and therebetween and extending rearwardly and laterally adjacent the roller.

2. The combination with a plow having a mold board and a plow beam, of a choking prevention roller pivotally mounted and spaced between the two, and a knife supported adjacent and parallel to the roller and having a cutting edge conforming to the roller contour.

3. The combination with a plow having a mold board and a plow beam, of a choking prevention roller pivotally mounted and spaced between the two, and a knife supported adjacent the roller and sharpened at its opposite edges.

4. The combination with a plow having a mold board and a plow beam, of a pivotally mounted choking prevention roller ellipsoidal in shape.

In witness whereof, I have hereunto affixed my signature.

FLORIAN C. ORR.